W. R. MORRISON.
ARMORED PNEUMATIC TIRE.
APPLICATION FILED FEB. 2, 1911.
1,061,313.
Patented May 13, 1913.
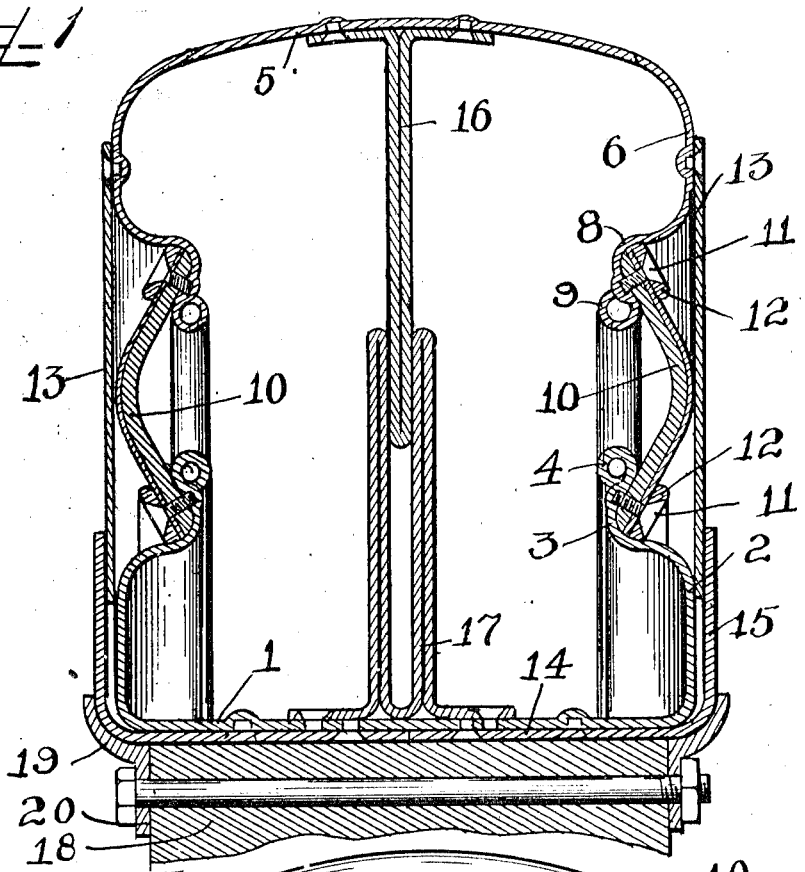
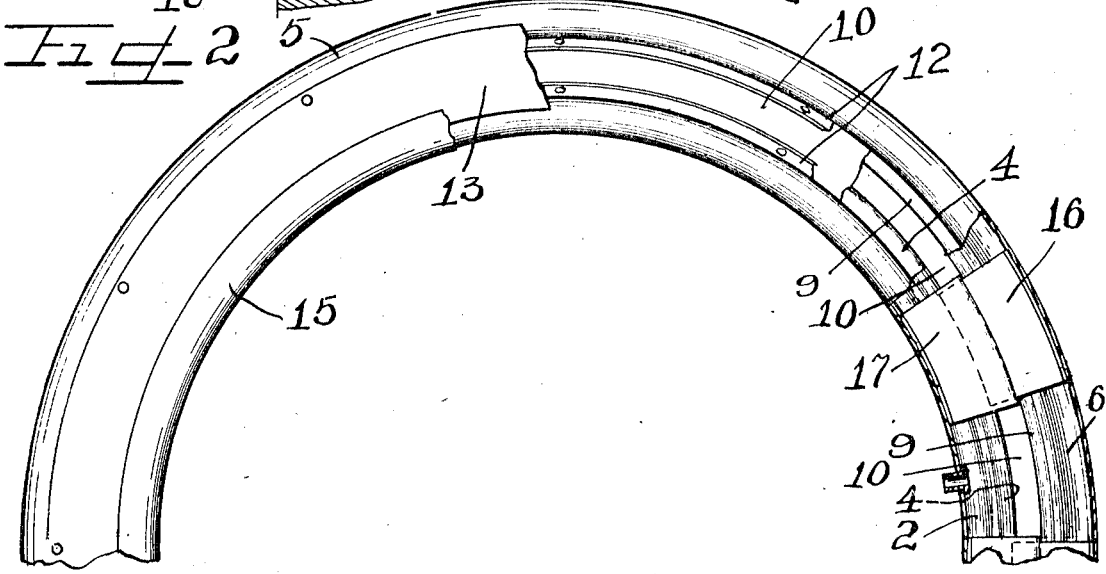

UNITED STATES PATENT OFFICE.

WILLIAM ROBERT MORRISON, OF CHICAGO, ILLINOIS.

ARMORED PNEUMATIC TIRE.

1,061,313.   Specification of Letters Patent.   Patented May 13, 1913.

Application filed February 2, 1911. Serial No. 606,095.

*To all whom it may concern:*

Be it known that I, WILLIAM ROBERT MORRISON, a citizen of the United States, and a resident of the city of Chicago, in the county of Cook and State of Illinois, have invented certain new and useful Improvements in Armored Pneumatic Tires; and I do hereby declare that the following is a full, clear, and exact description of the same, reference being had to the accompanying drawings, and to the numbers of reference marked thereon, which form a part of this specification.

With the rapid introduction into use of automobiles, a resilient tire for wheels became necessary, and, although numerous devices, including various arrangements of springs, have been tried and found more or less unsatisfactory, at the present time a very large source of expense of upkeep and operation of automobiles of any kind is occasioned by the necessity of tire repairs and renewals. In the case of pneumatic tires constructed of rubber, the cutting and puncturing of the tires in addition to loss due to road wear, affords a considerable source of expense as well as annoyance for the operator.

Pneumatic tires, as such, heretofore have not been found satisfactory for use on trucks or on armored automobiles for the reason that injury and deflation of the tire (which is so likely to occur) occasions such a difference in the diameter of the wheels as to very promptly and injuriously affect the operation of the car, and the car itself. Furthermore, the expense occasioned in the purchase of rubber tires and the frequent renewal thereof is a matter for serious consideration.

The object of this invention is to afford a pneumatic tire of such a construction as to practically obviate expense for repairs for long periods of time.

It is also an object of the invention to afford an armored tire which is puncture proof, and is adaptable for use for vehicles of any kind.

It is further an object of the invention to reduce the expense for the construction of tires to a minimum by reducing the amount of rubber used in the device to the least possible quantity, and to afford great strength and durability by utilizing steel to afford the major portion of the construction.

It is also an object of the invention to afford a structure in which injury to the tire can be occasioned only with difficulty, whether with intent or by accident.

The invention consists in the matters hereinafter described and more fully pointed out and defined in the appended claims.

In the drawings: Figure 1 is a transverse section of a tire embodying my invention. Fig. 2 is a reduced and fragmentary side elevation thereof.

As shown in the drawings: A channel rim having a web 1, adapted to fit upon the felly of the wheel, and parallel upwardly directed flanges, one on each side thereof, which extend substantially straight upwardly for a portion indicated by 2, and thence curved inwardly and near their inner margins upwardly and outwardly, as indicated at 3, in Fig. 1, and at the edges 4, are rolled to afford a non-cutting edge, and are integral with said web. A similar tread embracing a channel member having a convex web 5, to afford a tread, inwardly directed and curved flanges 6, and the inwardly and then outwardly curved portion 8, corresponding with the similarly curved portion 3, of the rim channel, and likewise having a rounded or bead edge 9, is arranged over and around the rim channel, as shown, and the inner diameter at the flange of the tread channel is sufficiently greater than the outer diameter at the flange of the rim channel as to afford a broad space therebetween on each side the channels.

An annular web or sheet 10, which may be constructed of rawhide, rubber, rubberized canvas, or any material impervious to air, is rigidly secured to the flat, outwardly inclined faces provided therefor adjacent to the rolled bead on each flange. Conveniently, said connecting webs or rings 10, may be constructed in two layers or thicknesses, the inner of which may be of material to confine the air under pressure in the casing, the outer of which may be of any suitable material to afford great tensile strength. Said webs are rigidly secured in place by means of bolts or screws 11, which extend through annular bands 12, of metal, which fit around the margins of said connecting members 10, and closely in the bends of the flanges, as shown in Fig. 1.

Means are provided for sustaining any lateral stresses due to turning corners. For this purpose, as shown, an annular thrust flange 13, is rigidly secured on each side of the tread channel, and the inner periphery of this ring extends alongside the straight wall flange 2, of the rim channel, fitting closely thereagainst at all times. An angle bar is secured on each side the rim channel with the web 14, thereof extending beneath and rigidly secured to the web of the channel for approximately half the width of said channel, and a flange 15, extending upwardly alongside the flange of the channel and above the inner periphery of the thrust flange 13, thereby affords a space between the flange of the rim flange and the flange 15, of the angle bar in which the thrust flange may move.

On large tires in which more severe stresses may be brought to bear, I provide an interior web 16, rigidly secured in any suitable manner within the tread channel and interfitting between upstanding parallel ribs or webs 17, rigidly secured in the bottom of the rim channel to the web thereof. These interior thrust sustaining members may be secured in any suitable manner to the respective channels. Of course, if electrically welded or permanently secured in place, said ribs 16 and 17, are constructed in substantially complemental sections, so that by partly turning the tread channel around the rim channel to bring the rib section of one channel into the spaces between the alined rib members of the other channel, permits the tread channel to be slipped laterally from the rim channel in disassembling.

The device may be secured upon the felly in any suitable manner. As shown, the felly 18, has secured on each side thereof an annular clamping band 20, the clenching flange 19, of which projects upwardly on each side of the tire to firmly hold the same from lateral movement on the felly.

An air valve of any suitable kind is connected in the tire casing through the felly, and the web of the rim flange. For this purpose, any suitable connection may be used to afford a tight joint to prevent leakage around the valve stem.

The operation is as follows: In assembling, the tread is slipped over the rim channel, the rib 16, for the tread channel inserted between the rib 17, on the rim channel as before described, and the tread channel partly rotated with reference to the rim to bring said ribs into firm bearing. The annular flexible connecting and packing members 10, are next laid in place, as shown in Fig. 1, the steel or other metal bands 12, suitably positioned thereon and screws or bolts 11, are inserted therethrough, rigidly clamping the margins of said annular connection firmly in place. The thrust flanges are next secured in place, the annular angle strips are then secured to the face of the tread channel by means of screws or bolts, and the device is secured upon the rim by means of the clamping ring 19, or any other suitable device for that purpose. The tire is then inflated to afford the desired air pressure within the casing so formed.

Of course, a characteristic tread will preferably be secured on the outer face of the tread channel. This, however, is omitted as forming no part of the present application for patent. In use, the load is at all times sustained upon the pneumatic cushion afforded within the tire, the load, of course, being sustained largely upon the resilient annular members 10, which are held outwardly by air pressure. Should a leak occur, said annular members 10, are made sufficiently strong to carry the load to a point of repair, even should complete deflation occur. Said connecting members 10, are not usually sufficiently narrow to permit the rolled edges 4 and 9, to contact in any event. Should such contact occur, however, no harm can be occasioned either to the channels or to said connecting members, owing to the rolled or beaded construction.

Of course, in the smaller sizes of tires, the thrust flanges and interior thrust sustaining ribs may be omitted, except in those instances in which the flexible connecting band may be exposed to unusual danger of injury, as, for example, where a tire is used on an armored automobile. When so used, the thrust flanges are also preferably used, inasmuch as the same afford armored plates to protect the only otherwise vulnerable part of the tire.

Of course, I am aware that details of the construction may be varied through a wide degree, and I have shown but one of numerous embodiments of my invention. I therefore do not purpose limiting the patent to be issued on this application for patent, otherwise than necessitated by the prior art.

I claim as my invention:

1. A tire of the class described embracing a rim channel, integral beaded flanges thereon, a similar tread channel of greater diameter inverted thereover, flexible airtight connecting members attached to said beaded flanges, annular rings secured thereover, complemental protective plates on each of said channels and a series of internal complemental webs and flanges affording lateral support between said rim and tread channels.

2. In a device of the class described a rim channel, a tread channel, beads turned on the peripheral edges of each, annular flexible strips connecting said channels, and rings adapted to be engaged over said strips at the edges thereof to secure the strip to the channels.

3. In a device of the class described an annular tread channel having the edges thereof directed inwardly to afford a bead, a rim channel, beads turned thereon, flexible airtight means securing the said members together, a series of complemental adjustable flanges secured on the interior of each member and engaging one another affording a lateral support for the said tread member.

4. An armored pneumatic tire comprising a rim and tread members curved toward one another, a flexible airtight connection joining said members at the edges, annular plates secured to the sides of said tread member, flanged annular plates secured around said rim member, slidably engaging said tread plates between said flanges and rim member, and a series of internal complemental flanges secured on each member affording a lateral support between the two.

In testimony whereof I have hereunto subscribed my name in the presence of two subscribing witnesses.

WILLIAM ROBERT MORRISON.

Witnesses:
LAWRENCE REIBSTEIN,
J. W. ANGELL.